US011695758B2

(12) United States Patent
Tav et al.

(10) Patent No.: US 11,695,758 B2
(45) Date of Patent: Jul. 4, 2023

(54) SECOND FACTOR AUTHENTICATION OF ELECTRONIC DEVICES

(71) Applicant: International Business Machines Corporation, Armonk, NY (US)

(72) Inventors: Doga Tav, Fredericton (CA); Ron Williams, Austin, TX (US); Hyman David Chantz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 399 days.

(21) Appl. No.: 16/799,784

(22) Filed: Feb. 24, 2020

(65) Prior Publication Data

US 2021/0266315 A1    Aug. 26, 2021

(51) Int. Cl.
*H04L 9/40*    (2022.01)
*G06F 3/01*    (2006.01)
(Continued)

(52) U.S. Cl.
CPC .......... *H04L 63/0861* (2013.01); *G06F 3/013* (2013.01); *G06V 40/172* (2022.01);
(Continued)

(58) Field of Classification Search
CPC ............... H04L 63/0861; H04L 63/083; H04L 2463/082; G06F 3/013; G06F 21/32;
(Continued)

(56) References Cited

U.S. PATENT DOCUMENTS 9,160,744 B1 * 10/2015 Machani ............. H04L 63/0428
9,294,476 B1 *  3/2016 Lurey ................. H04L 63/0838
(Continued)

FOREIGN PATENT DOCUMENTS

CN    110020620 A    7/2019

OTHER PUBLICATIONS

"Add Face Tracking to Your App", Mobile Vision, Printed from the Internet on Nov. 6, 2019, 2 pps., <https://developers.google.com/vision/android/face-tracker-tutorial>.
(Continued)

*Primary Examiner* — Aravind K Moorthy
(74) *Attorney, Agent, or Firm* — Aaron Pontikos

(57) ABSTRACT

A method for a multi-factor authentication, the method receives results of an initial authentication of a user. Responsive to confirming the initial authentication, an image of a secondary set of authentication options is presented. An option selection is received from the user, wherein the selection is determined by tracking eye movement of the user over the image that includes the set of second factor authentication options. User facial activity is tracked corresponding to the selection made from the secondary set of authentication options. The monitored facial activity is compared to a pre-established authentication condition to determine whether a match exists with the selected secondary set of authentication options, and responsive to facial activity monitored matching the authentication condition pre-established by the user and corresponding to the selection made from the secondary set of authentication options, authentication of the user is confirmed.

20 Claims, 5 Drawing Sheets

(51) Int. Cl.
*H04W 12/30* (2021.01)
*G06V 40/16* (2022.01)
*G06V 40/18* (2022.01)

(52) U.S. Cl.
CPC .......... *G06V 40/176* (2022.01); *G06V 40/193* (2022.01); *H04L 63/083* (2013.01); *H04W 12/30* (2021.01); *H04L 2463/082* (2013.01)

(58) Field of Classification Search
CPC .... G06F 21/31; G06V 40/172; G06V 40/176; G06V 40/193; G06V 40/18; H04W 12/30
See application file for complete search history.

(56) References Cited

U.S. PATENT DOCUMENTS

| | | | | |
|---|---|---|---|---|
| 9,426,139 | B1* | 8/2016 | McClintock | G06F 21/40 |
| 9,811,681 | B2* | 11/2017 | Landqvist | G06V 40/193 |
| 9,829,708 | B1* | 11/2017 | Asada | G06F 1/163 |
| 9,901,248 | B2* | 2/2018 | Wu | A61B 3/14 |
| 10,108,791 | B1* | 10/2018 | Masterman | G06F 21/316 |
| 10,187,568 | B1* | 1/2019 | Tran | H04M 1/0264 |
| 10,305,895 | B2* | 5/2019 | Barry | G07C 9/257 |
| 10,354,126 | B1* | 7/2019 | Nagalla | G06V 40/20 |
| 10,387,980 | B1* | 8/2019 | Shahidzadeh | G06Q 40/123 |
| 10,482,225 | B1* | 11/2019 | Abdulhayoglu | G06F 21/31 |
| 10,541,995 | B1* | 1/2020 | Mossier | H04L 63/0838 |
| 10,643,741 | B2* | 5/2020 | Gross | G16H 50/30 |
| 10,656,822 | B2* | 5/2020 | Bailey | G02B 27/017 |
| 10,667,007 | B2* | 5/2020 | Robinson | H04N 21/4223 |
| 10,698,701 | B1* | 6/2020 | De Jong | H04L 63/08 |
| 10,728,044 | B1* | 7/2020 | Melo | H04L 63/083 |
| 10,733,275 | B1* | 8/2020 | Knas | G06V 40/18 |
| 10,762,183 | B1* | 9/2020 | Charan | G06F 21/32 |
| 10,802,582 | B1* | 10/2020 | Clements | G06F 3/013 |
| 10,831,268 | B1* | 11/2020 | Golard | G06F 3/167 |
| 10,901,505 | B1* | 1/2021 | Haine | G06F 3/04815 |
| 10,902,104 | B2* | 1/2021 | Mapen | G06F 21/32 |
| 10,921,951 | B1* | 2/2021 | Rampoldi-Hnilo | G06F 3/0482 |
| 10,956,544 | B1* | 3/2021 | Knas | G06V 40/172 |
| 10,979,430 | B1* | 4/2021 | Hitchcock | H04L 63/102 |
| 11,037,149 | B1* | 6/2021 | Barakat | G06Q 20/4015 |
| 11,087,577 | B2* | 8/2021 | Westmacott | G06F 3/013 |
| 11,301,969 | B1* | 4/2022 | Khan | G02B 27/0093 |
| 11,303,631 | B1* | 4/2022 | Alexanian | G06F 21/32 |
| 2007/0011609 | A1* | 1/2007 | Adjouadi | G06F 3/013 706/15 |
| 2009/0284608 | A1* | 11/2009 | Hong | G06F 3/013 382/218 |
| 2012/0060030 | A1* | 3/2012 | Lamb | H04L 63/0876 726/2 |
| 2013/0044055 | A1* | 2/2013 | Karmarkar | G06F 21/32 345/158 |
| 2014/0055337 | A1* | 2/2014 | Karlsson | G06F 3/013 345/156 |
| 2014/0075548 | A1* | 3/2014 | Sampathkumaran | G06F 3/04883 726/19 |
| 2014/0189808 | A1* | 7/2014 | Mahaffey | G06F 21/31 726/4 |
| 2014/0195815 | A1* | 7/2014 | Taveau | G06F 21/32 713/186 |
| 2014/0204029 | A1* | 7/2014 | Lopez | G06F 3/013 345/173 |
| 2014/0247232 | A1* | 9/2014 | George-Svahn | G06F 3/033 345/184 |
| 2014/0256438 | A1* | 9/2014 | Grant | G06F 3/016 463/36 |
| 2014/0282945 | A1* | 9/2014 | Smith | H04L 63/0861 726/6 |
| 2014/0310531 | A1* | 10/2014 | Kun | H04W 12/33 713/182 |
| 2014/0340305 | A1* | 11/2014 | Seong | G06F 3/013 345/156 |
| 2015/0153912 | A1 | 6/2015 | Reily | |
| 2015/0268719 | A1* | 9/2015 | Li | G06F 3/0487 345/156 |
| 2015/0302252 | A1* | 10/2015 | Herrera | G06V 40/70 382/117 |
| 2015/0309568 | A1* | 10/2015 | Miki | G06F 3/0304 345/173 |
| 2015/0319294 | A1 | 11/2015 | Sudhir | |
| 2016/0070344 | A1* | 3/2016 | Gohl | G09G 5/377 345/156 |
| 2016/0070439 | A1* | 3/2016 | Bostick | G06F 3/0304 715/728 |
| 2016/0132670 | A1* | 5/2016 | Salama | G06V 40/172 726/19 |
| 2016/0162900 | A1* | 6/2016 | Dutt | G06Q 20/386 705/44 |
| 2016/0180068 | A1* | 6/2016 | Das | H04L 63/0861 726/7 |
| 2016/0231812 | A1* | 8/2016 | Hansen | G06F 3/04847 |
| 2016/0239081 | A1* | 8/2016 | Imoto | G06F 3/0481 |
| 2016/0358181 | A1* | 12/2016 | Bradski | H04L 63/0861 |
| 2016/0359838 | A1* | 12/2016 | Dasgupta | H04L 63/08 |
| 2017/0013464 | A1* | 1/2017 | Fish | H04W 12/12 |
| 2017/0032113 | A1* | 2/2017 | Tunnell | H04L 9/3231 |
| 2017/0038837 | A1* | 2/2017 | Faaborg | G06F 3/017 |
| 2017/0061482 | A1* | 3/2017 | Guo | G06Q 30/0255 |
| 2017/0111337 | A1 | 4/2017 | Saboori | |
| 2017/0123492 | A1* | 5/2017 | Marggraff | G06F 3/04845 |
| 2017/0154177 | A1* | 6/2017 | Tsou | G06V 40/18 |
| 2017/0168585 | A1* | 6/2017 | Faaborg | G06F 3/147 |
| 2017/0193213 | A1* | 7/2017 | Tsou | G06F 21/31 |
| 2017/0206400 | A1* | 7/2017 | Tsou | G06V 40/40 |
| 2017/0235361 | A1* | 8/2017 | Rigazio | G10L 15/22 715/710 |
| 2017/0302659 | A1* | 10/2017 | Shteingart | H04W 12/065 |
| 2017/0329396 | A1* | 11/2017 | Des Pommare | G06F 3/04842 |
| 2017/0329397 | A1* | 11/2017 | Lin | G06F 3/167 |
| 2017/0344840 | A1* | 11/2017 | Brown | G06V 40/197 |
| 2018/0054432 | A1* | 2/2018 | Bailey | G06F 16/162 |
| 2018/0068105 | A1* | 3/2018 | Shapiro | G06F 21/602 |
| 2018/0083973 | A1* | 3/2018 | Paraskevas | G06V 40/67 |
| 2018/0130459 | A1* | 5/2018 | Paradiso | G10L 13/04 |
| 2018/0189550 | A1* | 7/2018 | McCombe | G06V 40/172 |
| 2018/0246567 | A1* | 8/2018 | Campbell | G06F 3/013 |
| 2018/0314881 | A1 | 11/2018 | Sud | |
| 2019/0025910 | A1* | 1/2019 | Gilra | G06F 3/0481 |
| 2019/0033964 | A1* | 1/2019 | Kulkarni | G06F 3/04842 |
| 2019/0034057 | A1* | 1/2019 | Rudchenko | G06F 3/0481 |
| 2019/0034606 | A1* | 1/2019 | Mapen | G06F 21/32 |
| 2019/0036940 | A1 | 1/2019 | Balakrishnan | |
| 2019/0056785 | A1* | 2/2019 | Suk | G06F 3/0485 |
| 2019/0080065 | A1* | 3/2019 | Sheik-Nainar | G06V 40/40 |
| 2019/0094959 | A1* | 3/2019 | Tan | G06F 3/0482 |
| 2019/0129499 | A1* | 5/2019 | Li | G06Q 30/0241 |
| 2019/0156055 | A1* | 5/2019 | Rosenberg | G16H 10/20 |
| 2019/0166119 | A1* | 5/2019 | Hecker | G06V 40/70 |
| 2019/0167095 | A1* | 6/2019 | Krueger | A61B 3/113 |
| 2019/0207949 | A1* | 7/2019 | Parker | G06F 21/10 |
| 2019/0265787 | A1* | 8/2019 | Vennström | H04N 5/23296 |
| 2019/0294239 | A1* | 9/2019 | Suzuki | G06F 3/013 |
| 2019/0333276 | A1* | 10/2019 | Brown | A61B 90/50 |
| 2019/0334884 | A1* | 10/2019 | Ross | G06F 21/41 |
| 2019/0391642 | A1* | 12/2019 | Eil | G02B 27/0093 |
| 2019/0392129 | A1* | 12/2019 | Tsai | G06F 21/32 |
| 2019/0392163 | A1* | 12/2019 | Lake | G09G 3/002 |
| 2020/0019238 | A1* | 1/2020 | Agaoglu | G02B 27/0093 |
| 2020/0026830 | A1* | 1/2020 | Alameh | H04L 63/105 |
| 2020/0026831 | A1* | 1/2020 | Alameh | G06V 40/19 |
| 2020/0026835 | A1* | 1/2020 | Mitchell | G06V 40/1365 |
| 2020/0027297 | A1* | 1/2020 | Obradovic | H04L 63/0407 |
| 2020/0066041 | A1* | 2/2020 | Qian | G06V 40/107 |
| 2020/0066237 | A1* | 2/2020 | Wang | G02B 27/0179 |
| 2020/0084030 | A1* | 3/2020 | Nendell | H04L 9/0861 |
| 2020/0097076 | A1* | 3/2020 | Alcaide | G02B 27/0093 |
| 2020/0117788 | A1* | 4/2020 | Mohammad | G06F 3/011 |
| 2020/0125165 | A1* | 4/2020 | Pace | G06V 40/176 |
| 2020/0125322 | A1* | 4/2020 | Wilde | G06F 1/1686 |
| 2020/0143547 | A1* | 5/2020 | Heo | G06T 7/248 |

(56) References Cited

U.S. PATENT DOCUMENTS

| | | | |
|---|---|---|---|
| 2020/0162255 A1* | 5/2020 | Hunt | H04L 63/083 |
| 2020/0183382 A1* | 6/2020 | Schwindt | G08G 5/0052 |
| 2020/0193746 A1* | 6/2020 | Westmacott | G07C 9/37 |
| 2020/0238952 A1* | 7/2020 | Lindsay | B60R 25/40 |
| 2020/0304753 A1* | 9/2020 | Venkataraman | A61B 1/000096 |
| 2020/0348752 A1* | 11/2020 | Zerman | G06F 3/016 |
| 2020/0380099 A1* | 12/2020 | Ridgill, II | G06F 21/31 |
| 2020/0387220 A1* | 12/2020 | Cantor | G06F 3/167 |
| 2021/0089635 A1* | 3/2021 | Weeresinghe | G06Q 20/40145 |
| 2021/0096641 A1* | 4/2021 | VanBlon | G06F 3/0482 |
| 2021/0106219 A1* | 4/2021 | Gibson | G02B 26/101 |
| 2021/0192039 A1* | 6/2021 | Pihur | G06F 21/31 |
| 2021/0232218 A1* | 7/2021 | Zucker | G06F 3/0304 |

OTHER PUBLICATIONS

"Admiral Jeremiah Denton Blinks T-O-R-T-U-R-E using Morse Code as P.O.W.", Feb. 25, 2014, 2 pps., YouTube, <https://youtu.be/rufnWLVQcKg>.

"Face Detection with the Mobile Vision API", Printed from the Internet on Nov. 6, 2019, 1 pp., <https://codelabs.developers.google.com/codelabs/face-detection/index.html?index=..%2F..index#4 >.

"TrackEyes", © 2019 GitHub, Inc., 4 pps., <https://github.com/Pradyuman7/TrackEyes>.

Li et al., "Login Authentication with Facial Gesture Recognition", May 29, 2018, 38 pps., Computer Engineering Senior Theses. 111, <https://scholarcommons.scu.edu/cgi/viewcontent.cgi?article=1110&context=cseng_senior>.

\* cited by examiner

SECOND FACTOR AUTHENTICATION OF ELECTRONIC DEVICES

FIELD OF THE INVENTION

The present invention relates generally to the field of electronic device security, and more particularly to facial feature actions as a second visual authentication factor.

BACKGROUND OF THE INVENTION

Many actions and methods have been used to authenticate users of electronic devices. Personal Identification Numbers (PINs), dot-to-dot sketches, fingerprints, to name a few, have been used to verify the owner/user and unlock the device. More recently, facial recognition has become widely adopted as an authenticating method due to its ease of use, high trust level, and convenience. Authentication can be achieved by simply holding the electronic device in front of the owner's face for a brief time.

Facial recognition is often accomplished by use of three-dimensional mapping of a user's face, combined with learning techniques as the user's appearance may change, such as with facial hair, aging, makeup, etc. In some cases, some devices use simple camera images for facial recognition, which is more easily fooled by faked images.

SUMMARY

Embodiments of the present invention disclose a method, computer program product, and system. The embodiments include a method for a multi-factor authentication, the method providing for one or more processors to receive results of an initial authentication of a user. Responsive to a successful result of the initial authentication, the one or more processors presenting to the user an image including a set of secondary authentication options of facial activity. The one or more processors receiving a selection of an option from the user corresponding to the image including the set of second factor authentication options, such that the selection is determined by tracking eye movement of the user over the image. The one or more processors monitoring facial activity of the user corresponding to the selection made by the user from the secondary set of authentication options. The one or more processors determining whether the facial activity monitored matches an authentication condition, pre-established by the user, corresponding to the selection made from the secondary set of authentication options, and responsive to facial activity that is monitored matching the authentication condition pre-established by the user and corresponding to the selection made from the secondary set of authentication options, the one or more processors confirming authentication of the user.

DETAILED DESCRIPTION

Figure 1:
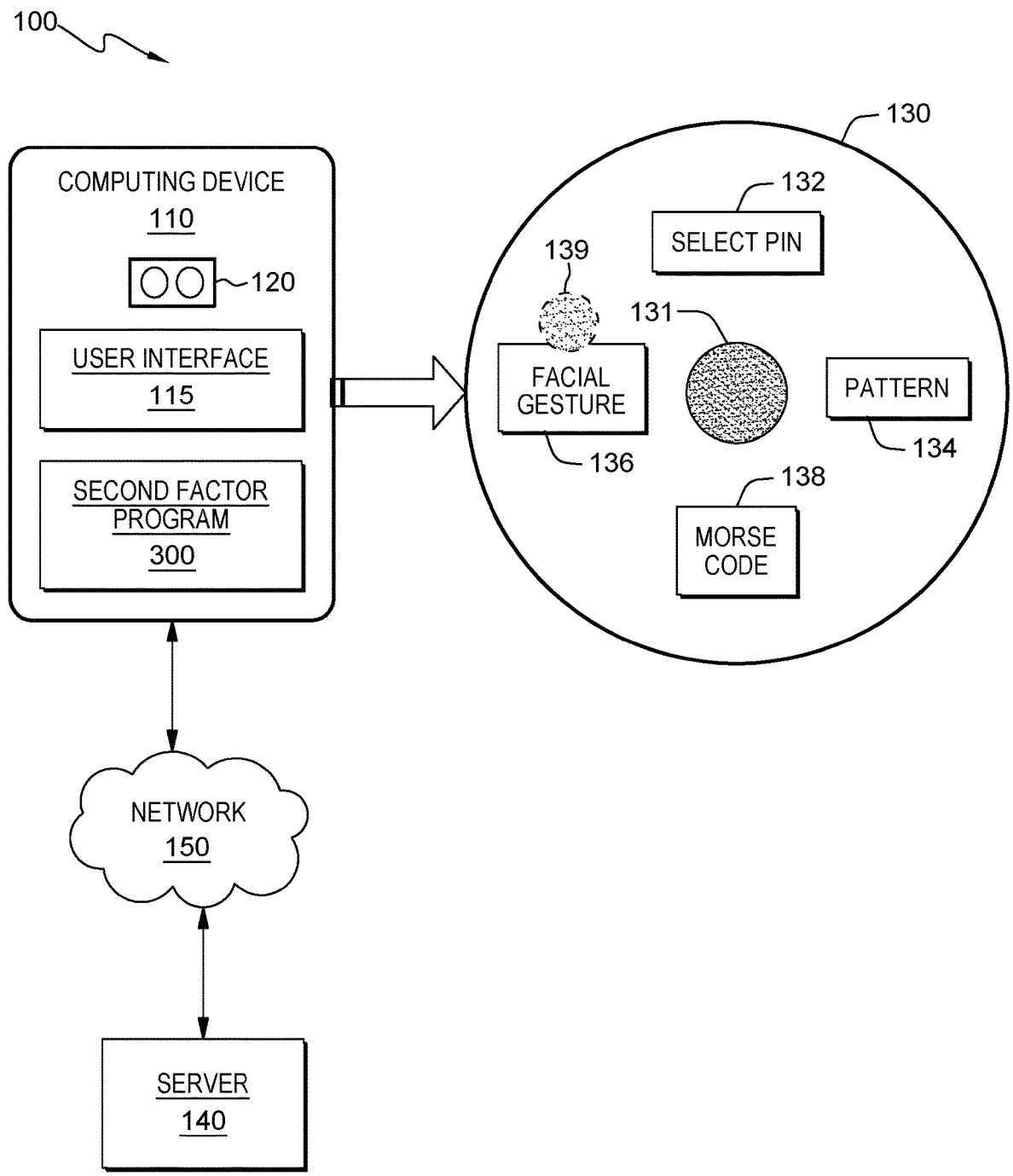
FIG. 1 is a functional block diagram illustrating a distributed data processing environment, in accordance with an embodiment of the present invention.

Embodiments of the present invention recognize that the security and privacy of mobile device data continues to grow in importance as user rely on their mobile devices for a majority of electronic, communicative, and computing needs. Embodiments recognize that electronic mobile devices that rely solely on facial recognition for security and privacy can be compromised by a malicious user merely holding the device in front of the user's face for a brief period of time. The compromise of device security may occur without prior awareness of the device owner or could occur with the device owner under duress. Additionally, advancement in three-dimensional printing can provide accurate duplication of facial recognition features, greatly simplifying defeat of facial recognition security.

In other embodiments, a user of a mobile device may wish to briefly check a status, such as time-of-day or an author of a message, without unlocking the device. Holding the device in front of the user's face to view the status will automatically and often unintentionally, unlock the device, leaving the device unsecured for a period of time. Embodiments of the present invention present status and notification data subsequent to a facial recognition authentication (or other initial authentication action) and maintain a locked condition of the device until a second factor authentication is completed, reducing security and privacy exposure of the mobile device.

Embodiments of the present invention provide a second factor authentication utilizing a set of options or menu, which is presented subsequent to successful facial recognition (or other initial) authentication. In some embodiments, to clearly depict the functionality and novel aspects, embodiments of the present invention are presented, herein, with respect to authentication of a mobile device; however, it is understood that function and features of embodiments are not limited to authentication of mobile devices and may apply to multiple applications utilizing two-factor authentication. Non-limiting examples may include, access to buildings, access to fenced-in or walled areas, room entry, starting of vehicles or machinery, and account access.

In some embodiments, the set of options for the second factor authentication include presentation of an image of selection options on the display of a mobile (or stationary) device that includes a focal point of a user's eye for eye movement tracking, and text or images positioned in an arrangement adjacent to the focal point. Embodiments of the present invention track the user's eye movement for selection of the second factor authentication. In some embodiments, blinking of the user's eyes prior to selection of a second factor authentication option triggers a default condition requiring manual entry of a passcode, and disabling the selection of a second factor authentication by user eye movement.

In embodiments of the present invention, the second factor authentication include selection of an option from an image including a set of secondary authentication options. The options providing the secondary authentication are generated by facial activity of the user. Embodiments of the present invention recognize that facial activity includes, but is not limited to: tracking eye movement for selection of items displayed in images presented to the user, tracking of eye movement in the tracing of a pattern, and facial gestures generated by the user flexing and moving facial features that include opening, closing, blinking and winking of eyes, raising and lowering of eye brows, flaring nostrils, shaping of lips, opening and closing of the mouth, exposing and positioning of the tongue, moving of cheeks, and moving of ears. In some embodiments, facial gestures include positioning an appendage of the user or an object held by the user on a facial feature.

In some embodiments, the set of secondary authentication options are comprised of various types of facial activity. Type of facial activity may include selecting a personal identification number (PIN) by tracking of the user's eye movement and pausing over an analog clockface image, a keypad image, a combination lock image, or other image that displays characters for selection. The set of second factor authentication options may also include tracing of a pattern generated by tracking of the user's eye movements. In some embodiments, the set of second factor authentication options also includes tracking eye blinking of the user as a Morse code input for a passcode and also includes generation of one or a series of facial gestures that may include an appendage or object positioned on a user's facial feature. In some embodiments, the facial gestures include time-duration attributes, such as a length of time a particular gesture is held as part of a series of facial gestures. In some embodiments, multiple second factor authentication options are used in combination.

Embodiments of the present invention recognize that an option utilizing facial gestures as a second factor authentication may offer effective and advantageous protection of individuals across a wide range of age and physical attributes and abilities of facial structure and musculature, making fraudulent duplication more difficult. Individuals having atypical structural or musculature conditions may have gestures and expressions that are specific and unique, which are difficult to duplicate and add further security to authentication for such individuals.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server 140, connected via network 150. Computing device 110 further includes user interface 115, camera 120, second factor program 300. Environment 100 also includes option image 130, which is depicted separately to illustrate additional details of options and option selection.

Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between computing device 110, second factor program 300 operating on computing device 110, and server 140, in accordance with embodiments of the present invention.

Computing device 110 includes user interface 115, camera 120 and second factor program 300. In some embodiments, computing device 110 can be a standalone mobile computing device, a smart phone, a tablet computer, a smart watch, a laptop computer, or other electronic device or computing system capable of receiving, sending, and processing data. In other embodiments, computing device 110 can be a computing device interacting with applications and services hosted and operating in a cloud computing environment. In another embodiment, computing device 110 can be a netbook computer, a desktop computer, a personal digital assistant (PDA), or other programmable electronic device capable of receiving programming instructions from second factor program 300 hosted on computing device 110 or communicatively connected to second factor program 300 operating remotely, such as on server 140. Computing device 110 includes internal and external hardware components, depicted in FIG. 4.

User interface 115 provides an interface to access features and functions of computing device 110. In some embodiments of the present invention, user interface 115 provides access to second factor program 300, operating on computing device 110. User interface 115 also supports access to other applications, features, and functions of computing device 110 (not shown). User interface 115 displays option image 130, initiated by second factor program 300. User interface 115 displays an image of optional choices to a user for a secondary authentication activity as a function of second factor program 300.

User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110. User interface 115 enables a user of computing device 110 to receive, view, hear, and respond to input, access applications, and perform functions available.

Camera 120 is an integrated feature of computing device 110. Camera 120 includes photo and video functions and interacts with additional functions of computing device 110 to perform facial recognition authentication. Camera 120 is further configured to monitor facial activity of the user, which includes identifying eye position of a user and tracking eye movement, detecting one or a series of facial gestures of the user, detecting open or closed eye conditions, and determining eye blinking of the user, for example, by analysis of video frames.

Second factor program 300 is depicted as hosted and operating on computing device 110. Second factor program 300 determines whether an initial authentication action is successful, such as a successful facial recognition authentication. In some embodiments of the present invention, second factor program 300 presents option image 130, which include option choices for a second factor authentication, to the user via user interface 115 of computing device 110. Second factor program 300 identifies coordinate location of the user's eyes, via input from camera 120, and tracks eye movement of the user as an indication of an option selection input of a second factor authentication. Subsequent to an option selection, second factor program 300 receives input from camera 120 corresponding to the selected second factor authentication option. The received input is analyzed by second factor program 300 to determine one or more, or a combination of: facial gestures, personal identification number (PIN) selected by tracking eye movement of the user, tracing of a pattern by eye movement, and transmitting a set of characters via Morse code by blinking. Second factor program 300 determines the validation of the second factor authentication based on the received input for the selected option.

Embodiments of the present invention include use of facial gestures and eye movement to generate a second factor authentication and may include multiple or combinations of the second factor options. The enumerated options include use of static images, video, sequence, and time duration of combinations to establish a second factor authentication of a user.

Second factor program 300 includes an option to cancel second factor options and default to a manual passcode (or PIN) entry, remaining in the default mode for a pre-determined time period. Second factor program 300 detects a rapid blinking sequence by the user for a brief pre-determined duration (e.g., 2-3 seconds, with at least 6 blinks). Having detected the rapid blinking sequence for the minimum duration, referred to herein as "alert mode" or "panic mode", second factor program 300 suspends selection of second factor options from option image 130, and defaults to a display on user interface 115 of computing device 110 requiring manual input of a password or PIN. In some embodiments the rapid blinking sequence detection is invoked by the user due to unfavorable or malicious conditions, such as attempts to force authentication under duress.

Option image 130 displays a listing or menu of user options for a second factor for authentication. Option image 130 is displayed on user interface 115 of computing device 110 subsequent to receiving confirmation of a successful initial authentication, such as facial recognition. In some embodiments of the present invention, option image 130 presents a list of second factor authentication options such that the options are positioned towards the outer boundaries of user interface 115 and adequately spaced to enable selection by tracking of eye movement of the user. Option image 130 includes focal point 131, select PIN 132, pattern 134, facial gesture(s) 136, Morse code 138, and eye track position 139. Option image 130 presents focal point 131 as a central portion of option image 130 enabling a reference position of the user's eye focus prior to option selection.

Second factor program 300 receives tracking of a user's eye movements subsequent to focusing of the user's eyes on focal point 131 for a brief duration (i.e., 2-3 seconds). Option image 130 presents second factor authentication options of select pin 132, pattern 134, facial gesture(s) 136, and Morse code 138, all of which are explained in more detail within discussion of FIG. 2 below. Options of option image 130 are selected by second factor program 300 receiving eye movement tracking of the user via camera 120. In some embodiments, the selection of second factor authentication options is made by moving and holding the focus of the user's eyes to one of the presented second factor options. Eye position 139 depicts an image corresponding to the eye position of a user making a selection on option image 130. Eye position 139 is displayed as feedback to the user to correspond to the detected eye position of the user's eye focus as detected from input of camera 120.

In some embodiments of the present invention, server 140 may host and operate second factor program 300 and communicatively interact with computing device 110, user interface 115, and camera 120. Embodiments presented herein include, but are not limited to, second factor authentication of a mobile computing device. In some embodiments, computing device 110 may be an authentication device integrated with access control to a building, an enclosed area, a room, or an account. In other embodiments, computing device 110 may control starting of a vehicle, a machine, a tool, or be associated with other authentication requiring activity. In some embodiments, second factor program 300 may operate from server 140 and communicatively interact with computing device 110. Second factor program 300, operating on server 140, may receive input of an initial authentication validation. Second factor program 300, operating on server 140, may transmit option image 130, establish X-Y coordinate eye position of a user from input received from camera 120 of computing device 110, and determine selection of second factor authentication option, or detect "panic mode" from the user. In some embodiments, second factor program 300 receives input from computing device 110 for the selected second factor authentication option and determines whether the input validates authentication of the user.

Server 140 can be a web server, a blade server, a desktop computer, a laptop computer, a tablet computer, a netbook computer, or any other programmable electronic computing device capable of operating second factor program 300, receiving, sending, and processing data, and communicating via network 150 with computing device 110, and other computing devices (not shown) within distributed data processing environment 100 via network 150. In other embodiments, server 140 can represent a virtual computing device operating based on multiple computers as a server system, such as in a cloud computing environment. In another embodiment, server 140 represents a computing system utilizing clustered computers and components (e.g., database server computers, application server computers, etc.) that act as a single pool of seamless resources when accessed within distributed data processing environment 100. Server 140 may include internal and external hardware components, as depicted and described in FIG. 4.

Figure 2A:
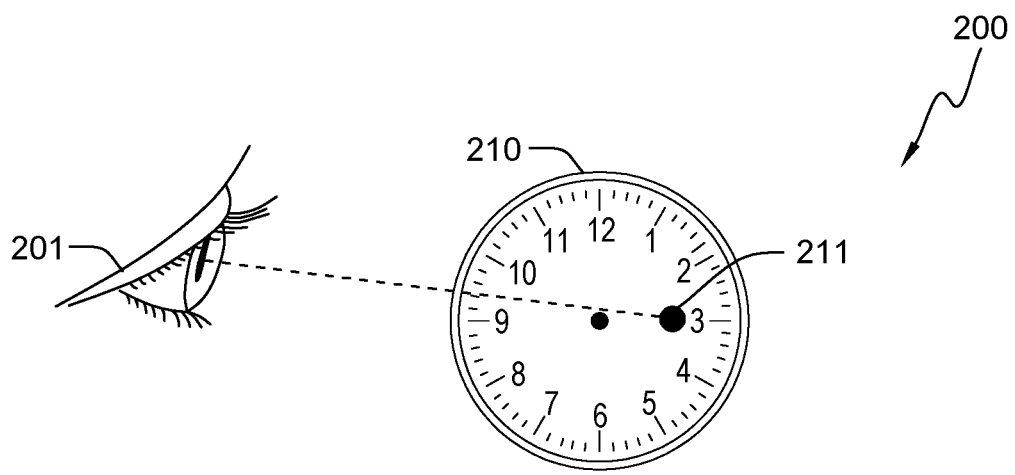
FIG. 2A illustrates indication of a personal identification number (PIN) as a second factor authentication option based on tracking user eye movement over a clock face image, in accordance with embodiments of the present invention.

FIG. 2A illustrates selection of a personal identification number (PIN) as a second factor authentication option based on tracking user eye movement over a clock face image. FIG. 2A includes user eyes 201, clockface image 210, and eye focus indicator 211. In some embodiments, selection of a second factor authentication option includes selection of numbers to input a user's PIN, in which second factor program 300 tracks movement of user eyes 201 to select numbers from clockface image 210 that correspond to the user's PIN. Movement of user eyes 201 are indicated by placing eye focus indicator 211 to correspond to the focus point of user eyes 201. In some embodiments, the X-Y coordinate position of the eyes of the user are established by the user focusing on a center position of clockface image 210, for example. Second factor program 300 can then determine eye movement by referencing the initial focal point. In some embodiments, user eyes 201 pause on each corresponding number of the user's PIN until complete.

Figure 2B:
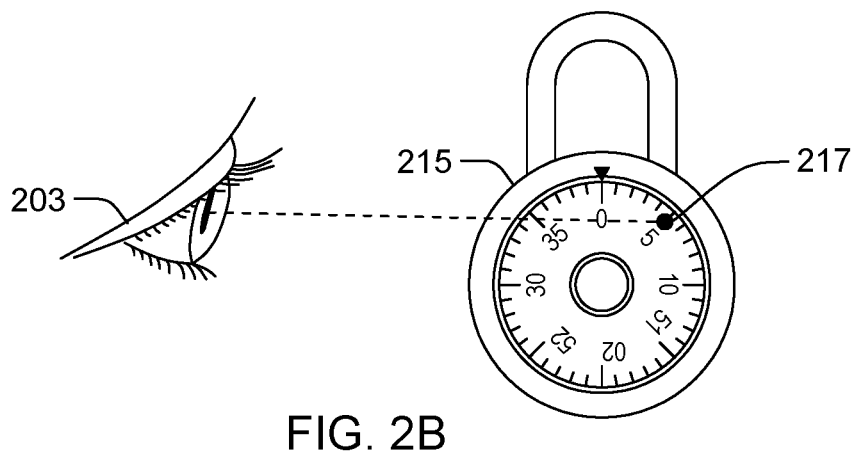
FIG. 2B illustrates indication of a PIN as a second factor authentication option based on tracking user eye movement over an image of a combination lock, in accordance with embodiments of the present invention.

FIG. 2B illustrates selection of a PIN alternatively from an image of a combination lock as a second factor authentication option, based on tracing user eye movement. FIG. 2B includes user eyes 203, combination lock image 215, and eye focus indicator 217. In some embodiments, selection of a second factor authentication option includes selection of numbers to input a user's PIN, in which second factor program 300 tracks movement of user eyes 203 to select numbers corresponding to the markings on combination lock image 215. The X-Y coordinates of user eyes 203 focus are calibrated by user eyes 203 focusing on a predetermined point, such as the image of the number "0" on combination lock image 215, or other focal point. Once the X-Y coordinates are calibrated, movement of user eyes 203 are tracked and displayed as eye focus indicator 217. As eye focus indicator 217 pauses on or adjacent to a particular number on combination lock image 215, second factor program 300 receives the corresponding number as input to the user's PIN. The user continues eye movement and pauses on combination lock image 215 until all numbers of the user's PIN are identified.

Figure 2C:
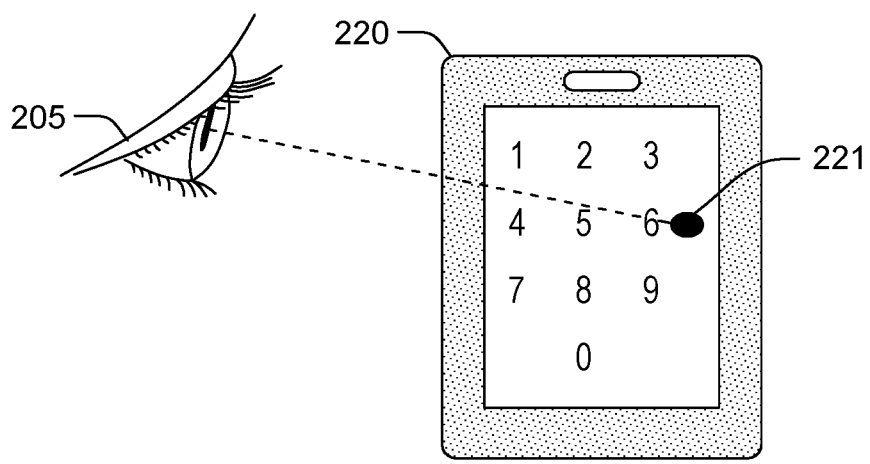
FIG. 2C illustrates indication of a PIN as a second factor authentication option based on tracing user eye movement over an image of a keypad, in accordance with embodiments of the present invention.

FIG. 2C illustrates selection of a PIN alternatively from a keypad image as a second factor authentication option based on tracing user eye movement. FIG. 2C includes user eyes 205, keypad image 220, and eye focus indicator 221. In some embodiments, selection of a second factor authentication option includes selection of numbers to input as a user's PIN, in which second factor program 300 tracks movement of user eyes 205 to select numbers from keypad image 220. The X-Y coordinates of user eyes 205 focus are calibrated by user eyes 205 focusing on a predetermined point, such as the image of the number "6" on keypad image 220, or other focal point. Once the X-Y coordinates are calibrated, movement of user eyes 205 are tracked and displayed as eye focus indicator 221. As eye focus indicator 221 pauses on or adjacent to a particular number on keypad image 220, second factor program 300 receives the corresponding number as input to the user's PIN. The user continues eye movement and pauses on keypad image 220 until all numbers of the user's PIN are identified.

Figure 2D:
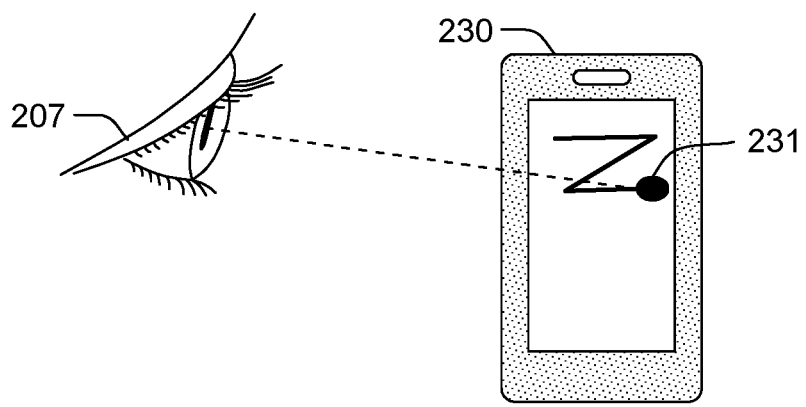
FIG. 2D illustrates generation of a pattern as a second factor authentication option, based on tracing an image corresponding to eye movement of a user on a display, in accordance with embodiments of the present invention.

FIG. 2D illustrates generation of a pattern as a second factor authentication option, based on tracing an image corresponding to eye movement of a user on a display. FIG. 2D includes user eyes 207, display 230, and eye focus indicator 231. In some embodiments of the present invention, user eyes 207 focus on a starting point of display 230, which may be pre-determined, to establish and calibrate an initial X-Y coordinate of user eyes 207. The user chooses a starting point on display 230, pausing until eye focus indicator 231 appears at the starting point of focus. User eyes 207 performs a trace of a pattern on display 230 by eye movement in which eye focus indicator 231 moves across display 230 corresponding to movement of user eyes 207. In some embodiments as eye focus indicator 231 moves by second factor program 300 tracking eye movement, second factor program generates a line on display 230 showing the path created as eye focus indicator 231 continues to move. Second factor program 300 receives the pattern traced on display 230 and determines whether the pattern validates authentication of the user.

Figure 2E:
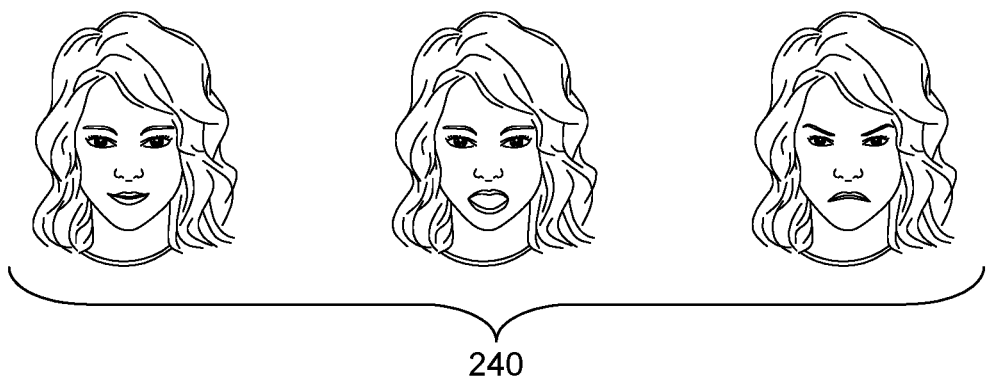
FIG. 2E illustrates a plurality of emoji representing various facial gestures of a user as a second factor authentication option, in accordance with embodiments of the present invention.

FIG. 2E illustrates a plurality of various facial gesture images of a user as a second factor authentication option. FIG. 2E includes facial gesture set 240. In some embodiments of the present invention, one or more facial gestures are performed by the user and captured by camera 120 of computing device 110. In some embodiments, the second factor authentication may be a sequence of facial gestures from facial gesture set 240. In some embodiments, the facial gestures may combine with a time duration of respective facial gestures in a sequence of gestures. In other embodiments, facial gestures as a second factor authentication include a video of facial gestures that include continual movement of one facial gesture into the next. In other embodiments, facial gesture set 240 includes positional placement of one or more fingers or one or both hands on the user's facial gesture.

Figure 2F:
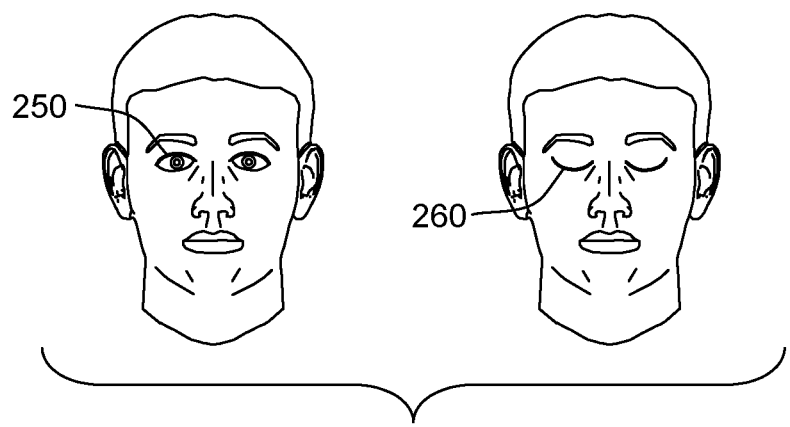
FIG. 2F illustrates indication of a blinking of a user's eyes disabling option selection and defaulting to manual entry of an authentication code, in accordance with embodiments of the present invention.

FIG. 2F illustrates blinking of a user's eyes which, when rapid for a brief duration, disables option selection and defaults to a manual entry of an authentication passcode. FIG. 2F includes open eyes 250 and closed eyes 260. In some embodiments of the present invention, rapid blinking of the user's eyes for a pre-determined duration are detected prior to or in an absence of a selection of a second factor authentication option. In some embodiments, in response to detecting rapid blinking of the user's eyes, second factor program 300 disables selection of second factor authentication options and defaults to a manual entry of a passcode on user interface 115 of computing device 110. In some embodiments, detection of rapid blinking indicates a compromising or malicious condition and disabling the second factor authentication option offers protection against unwanted access via computing device 110.

In some embodiments, blinking frequency and patterns, may be included as an option for a second factor authentication, utilizing combinations of time duration, frequency, and alternation of open and/or closed eyelids; however, use of blinking as a second factor authentication option should be clearly distinguished from use of rapid blinking to indicate an "alert or panic" mode.

Figure 3:
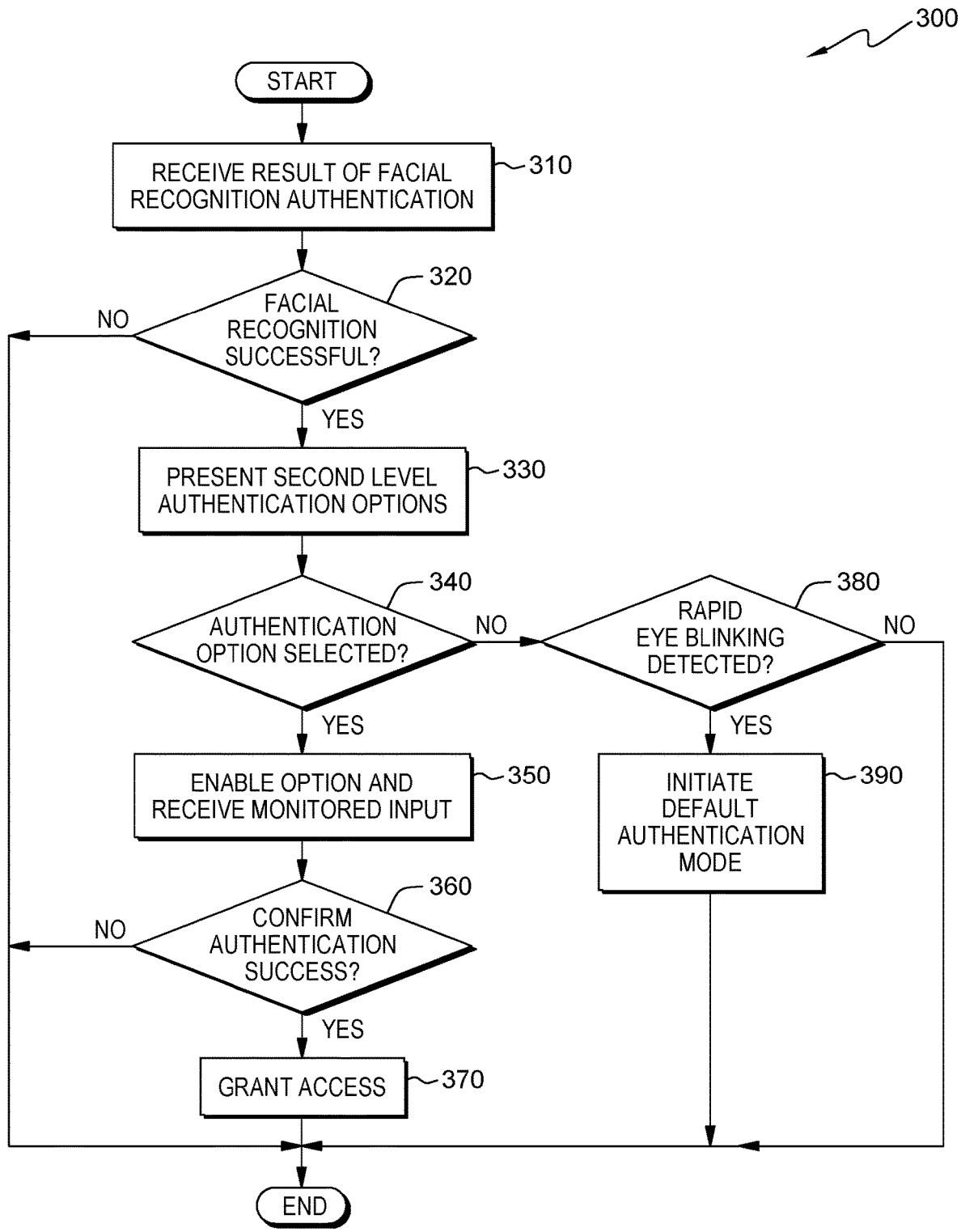
FIG. 3 is a flowchart depicting operational steps of a second factor program, operating in the distributed data processing environment of FIG. 1, in accordance with embodiments of the present invention.

FIG. 3 is a flowchart depicting operational steps of second factor program 300, operating in distributed data communications environment 100, in accordance with embodiments of the present invention. For purposes of clarity, the description and examples of operational steps of FIG. 3 presented below will be directed specifically to a mobile computing device as a mobile device, however embodiments of the present invention are not limited to mobile computing devices.

Second factor program 300 receives a result of facial recognition authentication (step 310). In some embodiments of the present invention, second factor program 300 runs in the background of a mobile computing device and "listens" for results of an initial authentication activity to unlock access to features and functions of the mobile computing device. For example, second factor program 300, running in the background of computing device 110 receives a result of a facial recognition authentication activity. In some embodiments, the mobile computing device described above may be substituted by a static or stationary computing device configured similar to computing device 110 and may include or be communicatively connected to second factor program 300. In such configurations, second factor program 300 may provide a secondary authentication option for entry, access, initiation, or other authentication confirmation purposes.

Second factor program 300 determines whether the facial recognition authentication is successful (decision step 320). Second factor program 300 receives the results of the initial authentication activity, such as facial recognition authentication, and determines whether the results indicate a successful authentication or failed authentication. For the case in which the results indicate a failed authentication (step 320, "NO" branch), second factor program 300 ends. In some embodiments, second factor program 300 may return to a "listening" mode and continue operating as a background application. For example, second factor program 300 receives a result of a facial recognition activity indicating a failed authentication and responds by returning to a listening mode operating in the background of computing device 110.

For the case in which the results of an initial authentication activity indicate a successful authentication, second factor program 300 presents second factor authentication options (step 330). Second factor program 300 presents an image of options for the second factor authentication on the user interface (display) of the mobile computing device. In some embodiments of the present invention, the image of options includes a focal point and a set of options positioned away from the focal point and separated within the image. In some embodiments, the set of options for the second factor of authentication include selection of a PIN, tracing a pattern, facial gesture(s), and Morse code. In other embodiments, additional or different options may be presented. Second factor program 300 can present the image of options to the user such that an option of secondary level of authentication is selected by tracking eye movement of the user.

For example, second factor program 300 presents option image 130 on user interface 115 of computing device 110. Option image 130 includes the options: select PIN 132, pattern 134, facial gesture(s) 136 and Morse code 138. Option image 130 includes focal point 131 centered within option image 130.

Having displayed an image of a set of second factor authentication options, second factor program 300 determines whether an authentication option is selected and if so, which option is selected (decision step 340). Second factor program 300 receives the tracked eye movements of the user subsequent to the display of the image of second factor authentication options and establishing eye contact with the focal point of the image of options. Second factor program 300 determines whether tracked eye movements indicate a selection of a presented option.

For the case in which second factor program 300 determines that an authentication option is not selected (step 340, "NO" branch), second factor program 300 proceeds to step 380 and determines whether rapid eye blinking is detected. Second factor program 300 receives frames from camera 120 of computing device 110 and utilizes the frames to determine indications of blinking and rate of blinking. For the case in which second factor program 300 does not detect rapid eye blinking, and no selection of a second factor authentication option, second factor program 300 ends. In some embodiments, second factor program 300 may continue to operate, returning to a listening mode while operating in the background of computing device 110.

For the case in which second factor program 300 confirms rapid eye blinking is detected (step 380, "YES" branch), for example, detecting eyes blinking at least 6 times within 2 seconds, second factor program 300 proceeds to step 390 and initiates a default authentication mode on the computing device. In some embodiments, the default authentication mode deactivates the second factor authentication options for a pre-determined period of time, for example, one hour, and defaults to a mode requiring manual input of a passcode as a secondary level authentication to unlock the computing device (or in other embodiments, enable entry, access, etc.).

Returning to decision step 340, for the case in which second factor program 300 determines an option was selected (step 340, "YES" branch), second factor program 300 displays images enabling the selected authentication option and receives monitored input of an authentication activity (step 350). In some embodiments of the present invention, second factor program 300 detects that a particular option is selected and enables the option by displaying an image associated with the option. Second factor program 300 receives monitored input of the second factor authentication from camera feed of the computing device.

In some embodiments, the option selected may be to select a PIN, whereas in another option, a pattern is traced on the display. In yet another option, one or more facial gestures may be received and may include time-duration associated with respective gestures. In still other options, a passcode may be received by Morse code as performed by detecting eye blinking of short and long duration. In some embodiments, a PIN is selected from an image of a clockface by second factor program 300 receiving eye movement tracking from camera 120 of computing device 110.

Eye tracking may be initially calibrated by determining an X, Y coordinate of a focal point within the displayed image of the clockface and displaying an indicator image of the eye movement on the clockface as feedback to the user. Alternatively, a keypad image may be used for PIN selection. A pattern generated by eye movement tracking may be displayed by tracing a line on a display of computing device 110 corresponding to the tracked eye movements. In some embodiments, one or more facial gestures may be presented and include a time-duration of presenting the gesture as a second factor authentication. Facial gestures may include open, closed, alternating, or blinking eyes as well as brief video of a sequence of multiple gestures.

Second factor program 300 determines whether the second factor authentication is confirmed as successful (decision step 360). Second factor program 300 receives results of the monitored input from the selected second factor authentication option and compares the input to previously established authentication data corresponding to the selected option and determines whether the monitored input received confirms the authentication of the user. For the case in which second factor program 300 determines that the received input fails to confirm authentication, second factor program 300 ends. In some embodiments, second factor program 300 may continue to operate, returning to a listening mode while operating in the background of computing device 110.

For the case in which second factor program 300 determines that the received input does confirm authentication of the user, second factor program 300 proceeds to grant access (step 370). In some embodiments, the confirmation of the second factor authentication results in unlocking computing device 110, enabling access to features and functions of computing device 110. In other embodiments in which computing device 110 is a static, stationary, or mounted device, confirmation of the second factor authentication results in granting entry, access, or initiation of another device, such as a motor. For example, computing device 110 may be a mounted device that includes camera 120 and user interface 115 as a display. Computing device 110 may unlock an entry door or enable access to an online account or enable starting of an engine or activation of a tool.

Having determined successful confirmation of the second factor authentication and granting access, second factor program 300 ends; however, in some embodiments, second factor program 300 may continue to operate, returning to a listening mode while operating in the background of computing device 110.

Figure 4:
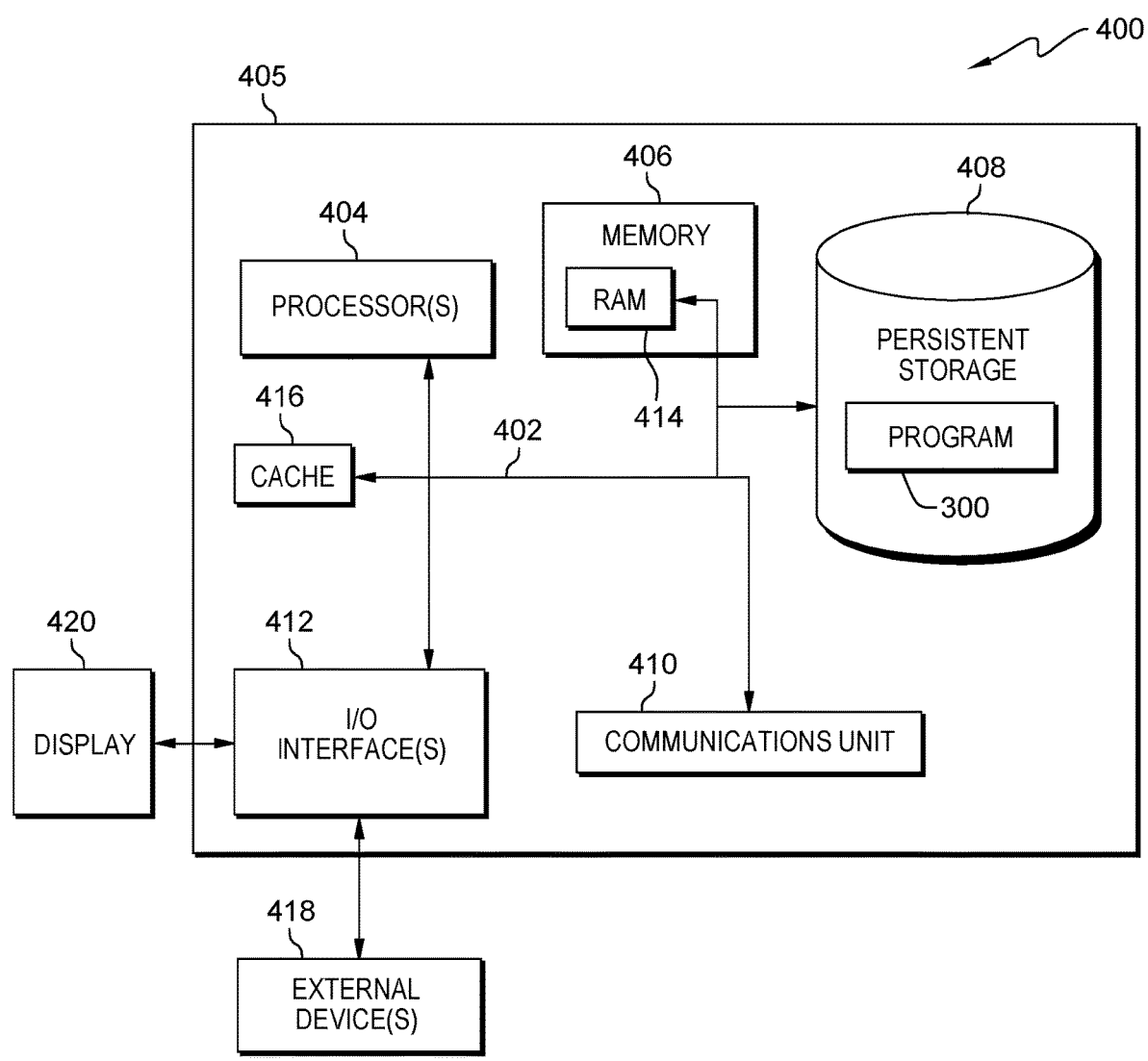
FIG. 4 depicts a block diagram of components of a computing system, including a computing device configured with capability to operationally perform the second factor program of FIG. 3, in accordance with an embodiment of the present invention.

FIG. 4 depicts a block diagram of components of computing system 400, including computing device 405, configured to include or operationally connect to components depicted in FIG. 1, and capable of performing operational steps of second factor program 300 of FIG. 3, in accordance with an embodiment of the present invention, in accordance with an embodiment of the present invention.

Computing device 405 includes components and functional capability similar to components of computing device 110, and server 140 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, second factor program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Second factor program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g. second factor program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a multi-factor authentication, the method comprising:
    one or more processors receiving results of an initial authentication of a user;
    responsive to a successful result of the initial authentication, the one or more processors presenting to the user an image including at least one facial gesture and a set of options combined as a second factor authentication of facial activity;
    the one or more processors determining a selection of an option from the user corresponding to the image that includes the at least one facial gesture and the set of options combined as the second factor authentication, wherein the selection of the option is determined by tracking eye movement of the user over the image;
    in response to determining the selection of the option by the user from the set of options, the one or more processors displaying the image of the at least one facial gesture in combination with the selected option for the user to perform and subsequently monitoring facial activity made by the user;
    the one or more processors determining whether the facial activity monitored matches an authentication condition, pre-established by the user, corresponding to the user performing the at least one facial gesture and the selection of the option made from the set of options combined as the second factor authentication; and
    responsive to the facial activity of the user matching the authentication condition pre-established by the user and corresponding to the at least one facial gesture and the selection of the option made from the set of options combined as the second factor authentication, the one or more processors confirming a second authentication of the user.

2. The method of claim 1, further comprising:
    the one or more processors determining an initial focal point of eye movement of the user on the image of the at least one facial gesture and the set of options combined as the second factor authentication;
    the one or more processors determining the selection of the option from the set of options; and
    the one or more processors presenting a second image enabling performance of the at least one facial gesture and the selection of the option from the set of options.

3. The method of claim 1, further comprising:
    the one or more processors determining whether the selection of the option from the image including at least one facial gesture and the set of options combined as a second factor authentication is received from the user;

in response to determining an absence of the selection of the option, the one or more processors determining whether rapid eye blinking is detected; and in response to determining that the rapid eye blinking is detected, the one or more processors deactivating the at least one facial gesture and the set of options and defaulting to a manual entry of a passcode to complete the second authentication.

4. The method of claim 1, wherein the selected option is a personal identification number (PIN) and the facial activity includes indicating the PIN by tracking the eye movement of the user on an analog clockface image displayed on a device of the user.

5. The method of claim 1, wherein the selected option is a PIN and the facial activity includes indicating the PIN by tracking the eye movement of the user on an image of a keypad displayed on a device of the user.

6. The method of claim 1, wherein the selected option is a sequence of one or more facial gestures and the facial activity includes tracking a time-duration associated with respective facial gestures made by the user.

7. The method of claim 1, wherein the selected option is detection of a passcode and the facial activity includes monitoring short and long duration blinking of eyes of the user to generate Morse code corresponding to the passcode.

8. The method of claim 1, wherein the selected option is a pattern and the facial activity includes tracking of the eye movements of the user generating the pattern.

9. The method of claim 1, wherein the selected option includes a sequence of a combination of options selected from the set of options combined with the at least one facial gesture as the second factor authentication.

10. A computer program product for a multi-factor authentication, the computer program product comprising:
one or more computer readable storage media; and
program instructions stored on the one or more computer readable storage media, the program instructions comprising:
program instructions to receive results of an initial authentication of a user;
responsive to a successful result of the initial authentication, program instructions to present to the user an image including at least one facial gesture and a set of options combined as a second factor authentication of facial activity;
program instructions to determine a selection of an option from the user corresponding to the image that includes the at least one facial gesture and the set of options combined as the second factor authentication, wherein the selection of the option is determined by tracking eye movement of the user over the image;
in response to determining the selection of the option from the set of options, program instructions to display the image of the at least one facial gesture in combination with the selected option for the user to perform and subsequently monitoring facial activity made by the user;
program instructions to determine whether the facial activity monitored matches an authentication condition, pre-established by the user, corresponding to the user performing the at least one facial gesture and the selection of the option made from the set of options combined as the second factor authentication; and responsive to the facial activity of the user matching the authentication condition pre-established by the user and corresponding to the at least one facial gesture and the selection of the option made from the set of options combined as the second factor authentication, the one or more processors confirming a second authentication of the user.

11. The computer program product of claim 10, further comprising:
program instructions to determine an initial focal point of eye movement of the user on the image of the at least one facial gesture and the set of options combined as the second factor authentication;
program instructions to determine the selection of the option from the set options; and
program instructions to present a second image enabling performance of the at least one facial gesture and the selection of the option from the set of options.

12. The computer program product of claim 10, further comprising:
program instructions to determine whether the selection of the option from the image including at least one facial gesture and the set of options combined as a second factor authentication is received from the user;
in response to determining an absence of the selection of then option, program instructions to determine whether rapid eye blinking is detected; and
in response to determining that the rapid eye blinking is detected, program instructions to deactivate the at least one facial gesture and the set of options and defaulting to a manual entry of a passcode to complete the second authentication.

13. The computer program product of claim 10, wherein the selected option is a personal identification number (PIN) and the facial activity indicating the PIN is determined by tracking eye movement of the user on an analog clockface image or a keypad image displayed on a device of the user.

14. The computer program product of claim 10, wherein the selected option is a sequence of one or more facial gestures and includes a time-duration associated with respective facial gestures.

15. The computer program product of claim 10, wherein the selected option is a passcode detected by monitoring Morse code generated by short and long duration blinking of eyes of the user.

16. A computer system for a multi-factor authentication, the computer system comprising:
one or more computer processors;
one or more computer readable storage media; and
program instructions stored on the one or more computer readable storage media, the program instructions comprising:
program instructions to receive results of an initial authentication of a user;
responsive to a successful result of the initial authentication, program instructions to present to the user an image including at least one facial gesture and a set of options combined as a second factor authentication of facial activity;
program instructions to determine a selection of an option from the user corresponding to the image that includes the at least one facial gesture and the set of options combined as the second factor authentication, wherein the selection of the option is determined by tracking eye movement of the user over the image;

in response to determining the selection of the option from the set of options, program instructions to display the image of the at least one facial gesture in combination with the selected option for the user to perform and subsequently monitoring facial activity made by the user;

program instructions to determine whether the facial activity monitored matches an authentication condition, pre-established by the user, corresponding to the user performing the at least one facial gesture and the selection of the option made from the set of options combined as the second factor authentication; and responsive to the facial activity of the user matching the authentication condition pre-established by the user and corresponding to the at least one facial gesture and the selection of the option made from the set of options combined as the second factor authentication, the one or more processors confirming a second authentication of the user.

17. The computer system of claim 16, wherein the selection of the option is a pattern and the facial activity includes tracking of the eye movements of the user generating the pattern.

18. The computer system of claim 16, further comprising:
program instructions to determine whether the selection of the option from the image including at least one facial gesture and the set of options combined as a second factor authentication is received from the user in response to determining an absence of the selection of the option, program instructions to determine whether rapid eye blinking is detected; and in response to determining that the rapid eye blinking is detected, program instructions to deactivate the at least one facial gesture and the set of options and defaulting to a manual entry of a passcode to complete the second authentication.

19. The computer system of claim 16, wherein the selected option is a personal identification number (PIN) indicated by tracking the eye movement of the user on an analog clockface image displayed on a user interface of a device of the user.

20. The computer system of claim 16, wherein the selected option is a personal identification number (PIN) indicated by tracking the eye movement of the user on an image of a combination lock including markings and characters displayed on a user interface of a device of the user.

* * * * *